Sept. 15, 1959　　　L. F. DOWDY ET AL　　　2,904,373
UTILITY HANDLE
Filed Sept. 4, 1957　　　　　　　　　　2 Sheets-Sheet 1
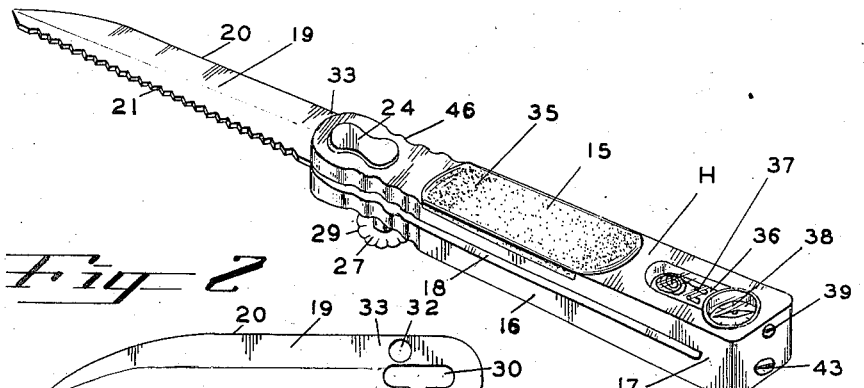
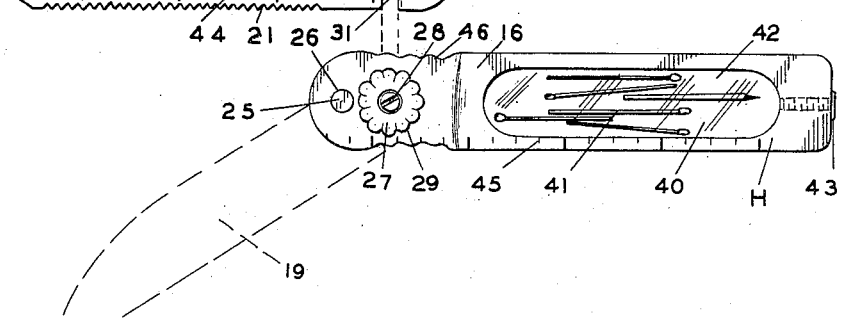
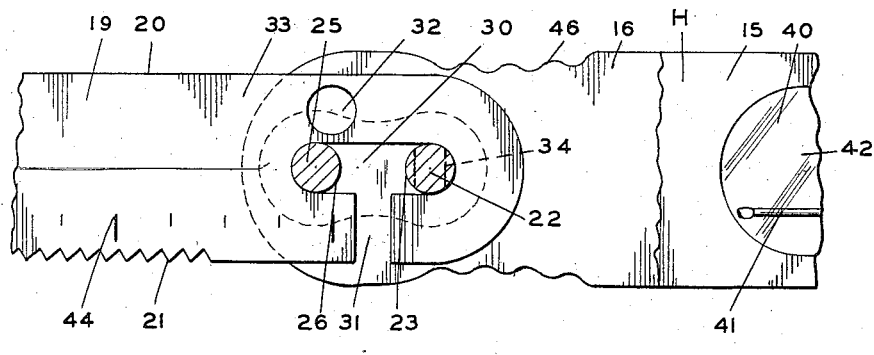
INVENTOR.
LLOYD F. DOWDY
ALBERT E. DAUGHTRY
BY
Kimmel & Crowell
Attorneys Sept. 15, 1959
L. F. DOWDY ET AL
2,904,373
UTILITY HANDLE
Filed Sept. 4, 1957
2 Sheets-Sheet 2
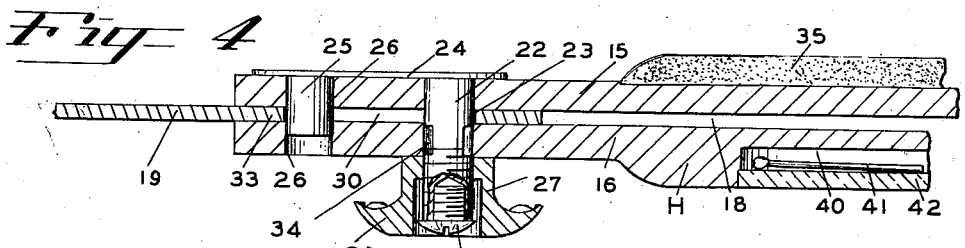
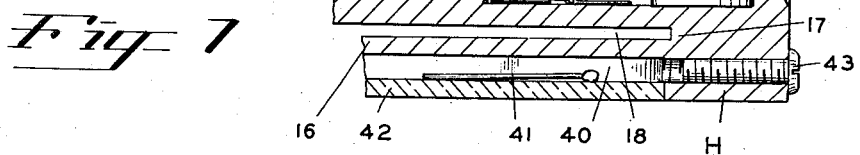
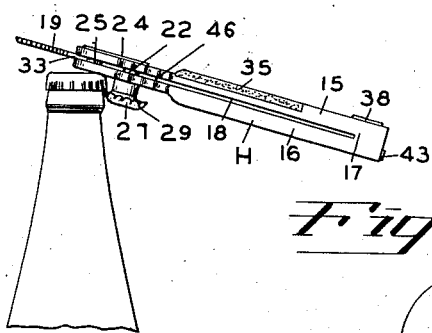
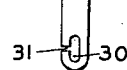
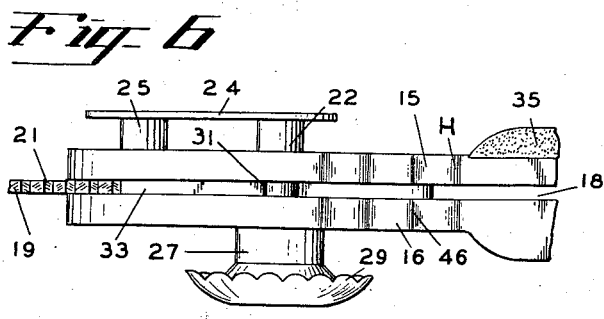
INVENTOR.
LLOYD F. DOWDY
ALBERT E. DAUGHTRY
BY
Kimmel & Crowell
attorneys 2,904,373

UTILITY HANDLE

Lloyd F. Dowdy, Mohawk, and Albert E. Daughtry, Eugene, Oreg.

Application September 4, 1957, Serial No. 681,964

3 Claims. (Cl. 306—1)

The present invention relates to utility handles, and particularly those adapted to be used in connection with implements, such as knives, wrenches, screw drivers, pliers, axes, shovels and so forth.

The primary object of the invention is to provide an interchangeable utility handle to be used for attachment to tools forming a part of emergency kits carried by hunters, campers, on airplanes, boats and other places where tools are used.

Another object of the invention is to provide a utility handle of the class described above in which is incorporated a compass, and waterproof compartments for carrying matches, pencils and the like, adapting the same to emergency kit use where heat, cold and moisture may be encountered.

Other objects and advantages will become apparent in the following specification when considered in the light of the attached drawings, in which:

Figure 1 is a perspective view of the invention shown holding a combination knife and saw.

Figure 2 is an exploded side elevation of the invention.

Figure 3 is a fragmentary enlarged side elevation shown partially in section for convenience of illustration.

Figure 4 is a fragmentary longitudinal sectional view of the handle and blade in operating position.

Figure 5 is a view similar to Figure 4 of the butt end of the handle.

Figure 6 is a fragmentary edge view of the handle and blade, showing the blade being removed or replaced within the handle.

Figure 7 is a side elevation which illustrates a portion of the handle being used for removing a bottle cap.

Figure 8 is a plan view of an implement in the form of an axe adapted to be attached to the handle.

Figure 9 is a plan view of an implement in the form of a shovel.

Figure 10 is a plan view of an implement in the form of a crescent wrench.

Referring now to the drawings in detail wherein like reference numerals indicate like parts throughout the several figures, the reference character H indicates generally a utility handle constructed in accordance with the invention.

The handle H includes two spaced parallel handle members 15 and 16, having their adjacent ends integrally joined at 17. This provides an elongated slot 18 throughout practically the entire length of the handle H. When the handle H is being used for receiving an implement 19, it can be folded within the slot 18 while not in use. The implement 19 is thin and includes a cutting edge 20 and a toothed edge 21 providing a knife blade and a hand saw.

The implement 19 is mounted to the handle H in the following manner. A clamping bolt 22 passes through an opening 23 of the handle members 15 and 16, as best illustrated in Figures 3 and 4. Fixedly secured to one end of the bolt 22 is a cross head 24.

A locking pin 25 is fixedly secured to the opposite end of the cross head 24 and passes down through openings 26 within the handle members 15 and 16. A lock nut 27 is threaded to the opposite end of the bolt 22 and retained thereon by a locking screw 28, as best illustrated in Figure 4. The lock nut 27 has a corrugated head 29 formed thereon to facilitate the tightening or loosening of the lock nut 27, and also for being operated as a bottle opener, as illustrated in Figure 7.

The shank 33 of the implement 19 to be attached to the handle H is designed as follows. Referring particularly to Figures 3, 4 and 6, an elongated slot 30 is formed in the implement 19, having a transverse slot 31 formed on one side of the slot 30. A hole 32 is also formed in the shank 33 of the implement 19, the object of which will be described later.

In applying the implement 19 to the handle H, the lock nut 27 is released to the position shown in Figure 6. This raises the cross head 24 and the locking pin 25, the shank 33 of the implement 19 can then be removed or brought into place. Cut-away portions 34 are formed in the bolt 22 and when raised to the position shown in Figure 6, the slot 31 of the shank 33 can be moved across the cut-away portion of the bolt 22, after which the implement 19 can be moved to the position shown in Figures 3 and 4. This brings the opposite end of the slot 31 in line with the locking pin 25, after which the nut 27 is tightened, pulling the cross head 24 down against the side of the handle H, and clamping the sides 15 and 16 of the handle H tightly against the shank 33 of the implement 19.

In the event it is desired to mount the implement 19 at an angle to the handle H, as indicated by broken lines in Figure 2, the hole 32 is rotated into alignment with the locking pin 25, which will lock the blade 19 at an angle to the handle H, providing an ideal relation between the blade 19 and the handle H when operated as a hand saw.

When the locking nut 27 is cinched down, it moves the cut-away portion 34 in the bolt 22 below the shank 33 of the implement 19 so that it is impossible to remove the slot 31 from the bolt 22 until after the bolt 22 is again raised a sufficient height to allow the slot 31 to pass by the cut-away portion 34.

Referring to Figures 1, 4 and 5, a whetstone 35 is fixedly positioned on the side 15 of the handle H by any suitable means, also a compartment 36 is provided, which may contain fish hooks 37 or the like. A compass 38 is embedded in the handle H and held in place by locking screw 39. Access is had to the fish hooks 37, or other similar devices, by removing the locking screw 39 and the compass 38, after which the contents of the compartment 36 can be removed or replaced.

The opposite side 16 of the handle H, referring particularly to Figures 2, 4 and 5, has a compartment 40 in which matches 41, pencils or the like, may be carried. The compartment 40 is water tight and has a water sealed transparent cover 42 so that the contents may be observed. Access to the compartment 40 may be had by removing a water tight screw 43.

We do not wish to be limited to the number of compartments embedded within the handle, but the object is to provide a handle that is adapted to fit many implements and to carry objects in water tight compartments and to provide a compass so that in emergency cases it will assist the user to know his directions, at the same time giving him a very useful emergency kit of many instruments.

It will be noted that a measuring scale 44 is provided on the implement 19 and a scale 45 on the handle H so that measurements may be taken if desired in the use of the handle H. Corrugations 46 are provided for gripping the handle H more securely in operating the same.

Referring to Figure 7, a handle H is shown being used for removing caps from bottles and the like. Many other uses of implements are provided for this combination not here shown or described.

Having thus described the preferred embodiment of the invention, it should be understood that numerous structural modifications and adaptations may be resorted to without departing from the scope of the appended claims.

What is claimed is:

1. A combination implement and detachable handle therefor comprising an elongated relatively flat shank integrally formed on said implement, said shank having a central longitudinally extending slot formed adjacent the free end thereof and a transverse slot extending perpendicularly from the mid point of said longitudinal slot and opening through the longitudinal edge of said shank, said transverse slot having a width less than the width of said longitudinal slot, a pair of elongated spaced apart parallel handle forming members integrally joined at one end and having said shank removably positioned therebetween at the other ends thereof, an elongated axially slidable locking bolt extending between said members and through one end of said longitudinal slot, an axially slidable locking pin extending between said members and through the other end of said longitudinal slot oppositely of said locking bolt, said locking pin having a length substantially less than the length of said locking bolt, a cross head extending perpendicularly of said locking bolt and said locking pin and rigidly secured to one end of each, and releasable means engaging said locking bolt securing said locking bolt and said locking pin in locked position with respect to said shank and said handles, said locking pin disengaging from said shank on axial sliding sliding movement of said locking pin upon release of said releasable means on said locking bolt, said locking bolt and said locking pin each having a diameter substantially equal to the width of said longitudinal slot and said locking bolt having a reduced cross-sectional portion for sliding movement through said transverse slot in assembling said shank to said handle.

2. A device as claimed in claim 1 wherein the means for releasably securing said locking bolt in locking position comprises a lock nut threadably engaged over said locking bolt with said locking bolt having releasable means thereon for securing said thumb screw on said bolt.

3. A device as claimed in claim 1 having a lock nut threadedly engaged with the end of said locking bolt oppositely of said cross head said nut having a corrugated head formed thereon and spaced from one of said handle forming members for use in conjunction with the latter as a bottle cap remover.

References Cited in the file of this patent

UNITED STATES PATENTS

| | | |
|---|---|---|
| 287,809 | Devereux | Nov. 6, 1883 |
| 298,115 | Peace | May 6, 1884 |
| 885,521 | Remington | Apr. 21, 1908 |
| 912,411 | Putney | Feb. 16, 1909 |
| 1,627,689 | Culver | May 10, 1927 |
| 2,146,777 | Strong | Feb. 14, 1939 |
| 2,622,729 | Uttz | Dec. 23, 1952 |

FOREIGN PATENTS

| | | |
|---|---|---|
| 329,566 | Great Britain | May 22, 1930 |
| 550,267 | France | Dec. 8, 1922 |